Figure 1:
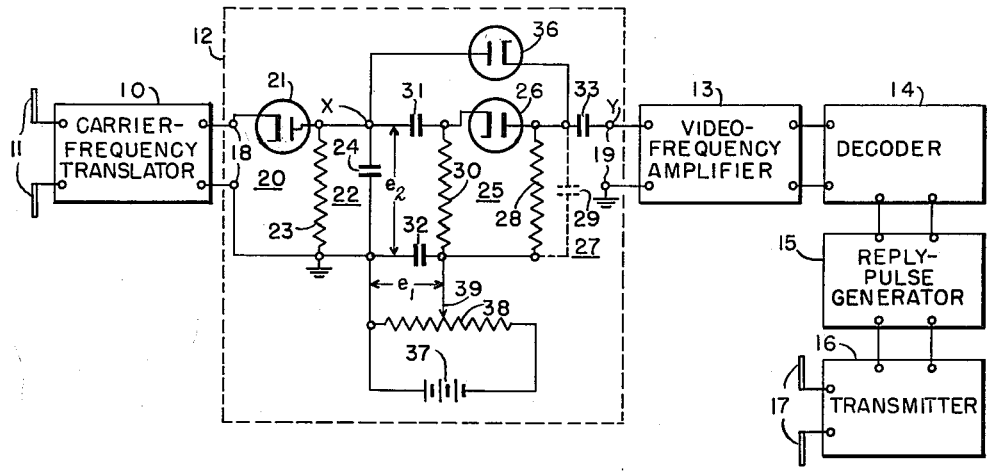

Jan. 26, 1960 W. B. GAUNT 2,922,877
PULSE-DETECTOR SYSTEM
Filed Oct. 20, 1953

United States Patent Office 2,922,877
Patented Jan. 26, 1960

2,922,877
PULSE-DETECTOR SYSTEM

Wilmer B. Gaunt, Brooklyn, N.Y., assignor to Hazeltine Research, Inc., Chicago, Ill., a corporation of Illinois Application October 20, 1953, Serial No. 387,283

12 Claims. (Cl. 250—27)

General

The present invention is directed to pulse-detector systems and, more particularly, to pulse-detector systems having utility in pulse-type receivers and in radio beacons or transponders. Such detector systems have particular utility in airborne transponders and hence will be described in that environment.

Airborne transponders form one link in a radio-communication system which includes one or more interrogator-responsors that are often terrestrially located. Wave-signal interrogating pulses having predetermined durations and spacings in accordance with an established code are transmitted by the interrogator-responsor and are received by a transponder having a decoder conditioned to translate the received coded pulses to an encoder. The latter develops coded reply pulses for application to the transmitter of the transponder which radiates coded wave-signal pulses that are received by the interrogator-responsor and are then decoded and applied to a utilizing device such as a cathode-ray tube which may provide a suitable display indicative of the presence of the aircraft carrying the transponder and its position with relation to the interrogator-responsor.

In addition to navigational uses, one of the important applications of a radio-communication system of the type under consideration is the recognition and identification of friendly or enemy aircraft, commonly referred to as IFF which is an abbreviation for "Identification, Friend, or Foe." The value of such a system is so well established in military circles that in time of war the enemy has endeavored to establish countermeasures to render an IFF system ineffective. One countermeasure is termed "jamming" and comprises the use of radiated continuous-wave signals which interfere with the proper operation of the pulse-translating circuits of the receivers of the IFF system so that the various circuits cannot perform their desired functions and, thus, provide the vital identification.

Various circuits have been proposed to overcome undesired continuous-wave jamming. One such circuit has involved the use of a pulse-detector system comprising the cascade combination of two detectors which may, in the remarks which follow, for convenience be referred to as the second and third detectors of a receiver. A manually operated switch is connected in shunt with the third detector tube or device so that it may be disabled during the reception by the receiver of pulse-type wave signals which have not been subjected to continuous-wave jamming, thereby providing in the output circuit of the second detector output pulses of suitable amplitude and of rectangular wave form. When the received wave-signal pulses are being subjected to continuous-wave jamming, however, the operator observes this jamming on a suitable display and opens the switch just mentioned so that the third detector is conditioned to perform its function of detecting the composite output signal of the second detector, which signal includes a radio-frequency energy having, for example, negative portions lying within the envelope of the desired negative unidirectional pulses derived by the second detector and having similar positive portions extending above the zero axis of the unidirectional pulses. This radio-frequency energy is ordinarily a beat frequency between the desired pulse-type wave signal and the undesired continuous-wave signal. The third detector is poled so that it translates only the negative-polarity portions of the composite signal and develops an output signal of slightly reduced amplitude with a wave form which is approximately rectangular and hence capable of operating the utilizing device coupled to the third detector. When the continuous-wave jamming has ceased, the switch is opened in order that substantially rectangular pulses are translated by the output circuit of the second detector to a utilizing device.

While prior such detector systems are very desirable for many applications, they have the disadvantage of requiring an operator to note the presence of continuous-wave jamming in order to open a switch to enable a third detector and to close that switch to disable that detector in the absence of jamming. This requirement represents a serious disadvantage for some applications. For example, a detector system of the type which is mentioned cannot, as a practical matter, be employed in an airborne transponder since such an apparatus, for the purpose of minimizing weight, power, and space requirements, does not include display units to indicate to the pilot the presence of jamming. Consequently, he has no knowledge of the jamming of his transponder by the enemy and cannot of his own initiative perform any adjustments to counteract this jamming. Furthermore, the busy pilot of a military aircraft such as a fighter plane presently does not have the time to study an additional display and to adjust controls in response to the information presented in the display. Manifestly, it would be desirable to include in a transponder a detector system which not only derives desired output pulses of rectangular wave form from applied wave-signal pulses which are free from continuous-wave jamming but also includes circuits automatically enabled by such jamming to derive useful rectangular output pulses substantially free from the effects of that jamming.

It is an object of the invention, therefore, to provide a new and improved pulse-detector system which avoids one or more of the above-mentioned disadvantages and limitations of prior such detector systems.

It is another object of the invention, therefore, to provide a new and improved pulse-detector system which is automatically conditioned by an undesired signal to reduce or avoid in its output circuit the detrimental effects of that signal.

It is a further object of the invention, therefore, to provide a new and improved pulse-detector system which is automatically conditioned to derive in its output circuit substantially rectangular pulses in response to an applied signal which includes desired wave-signal pulses but may also include an undesired continuous-wave signal.

It is an additional object of the invention, therefore, to provide a new and improved pulse-detector system which is simple in construction and inexpensive to manufacture.

In accordance with a particular form of the invention, a pulse-detector system for use in a radio receiver for translating an applied pulse-modulated wave signal of a predetermined frequency but subject to an undesired wave signal having that frequency comprises a first detector responsive to the applied wave signal for deriving the pulse-modulation components thereof in the absence of the aforesaid undesired signal and for deriving from the latter a control potential. The pulse-detector system also includes a second detector including only passive elements coupled in cascade with the first detector and including a load impedance for deriving thereacross in the presence of the aforesaid undesired signal the aforesaid pulse-modulation components substantially free from the undesired signal. The pulse-detector system further includes a normally conductive unidirectionally conductive device shunting the second detector and coupled to the first detector, to be rendered nonconductive by the aforesaid control potential derived in the presence of the undesired signal. The pulse detector system finally includes means for maintaining the unidirectionally conductive device normally conductive in the absence of the undesired signal.

For a better understanding of the present invention, together with other and further objects thereof, reference is had to the following description taken in connection with the accompanying drawing, and its scope will be pointed out in the appended claims.

Figure 2A:
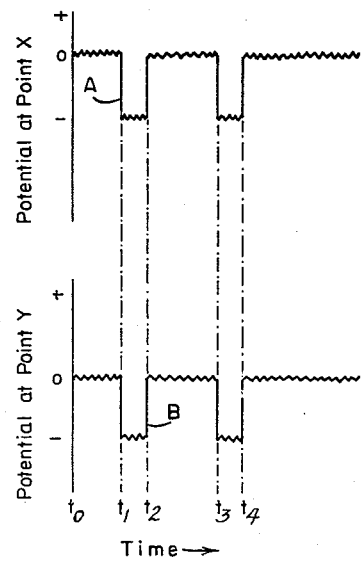
Figure 2B:
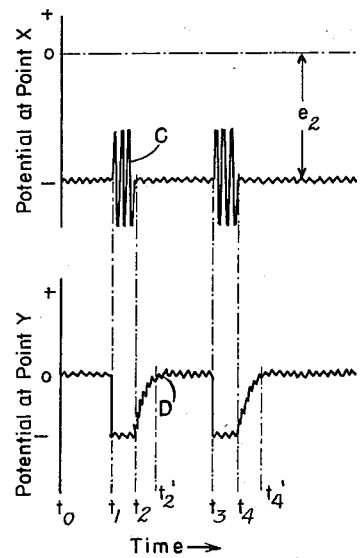

Referring now to the drawing:

Fig. 1 is a circuit diagram, partly schematic, of a complete transponder including a pulse-detector system in accordance with the present invention, and Figs. 2a and 2b are graphs utilized in explaining the operation of the pulse-detector system of Fig. 1.

*General description of transponder of Fig. 1*

Referring now to Fig. 1 of the drawing, there is represented a transponder which may be mounted on a suitable object such as a moving aircraft. This transponder comprises a carrier-frequency translator 10 having an input circuit coupled to an antenna system 11. The translator 10 may be a suitable superregenerative circuit such as a superregenerative superheterodyne system of the type disclosed in Patent 2,588,022 to Bernard D. Loughlin, or may be a superheterodyne circuit including one or more stages of wave-signal amplification, an oscillator-modulator, and one or more stages of intermediate-frequency amplification. Coupled in cascade with the output circuit of unit 10 are a pulse-detector system 12, which is constructed in accordance with the present invention and will be described more fully hereinafter, a video-frequency amplifier 13, a decoder 14, a reply-pulse generator 15, and a transmitter 16 having an antenna system 17. The decoder 14 may comprise suitable circuits such as those which respond only to groups of pulses having predetermined durations and spacings established in accordance with a predetermined code, and derives an output pulse for each group for application to the reply-pulse generator 15. The latter may be an encoder for developing from the pulses applied thereto a suitable signal such as coded output pulses for application to the transmitter. The transmitter may include suitable amplifier or driver stages, a modulator, and a high-frequency oscillator for developing and applying a pulse-modulated carrier-wave signal to the antenna system 17 for radiation thereby. For some applications the carrier-frequency translator 10 and the transmitter 16 may employ a common antenna system with suitable means such as a duplexer for electrically isolating the units 10 and 16 from each other during alternate operating intervals of the respective units. However, by way of illustration, separate antenna systems have been represented for the transponder under consideration.

It will be understood that the various units thus far described, with the exception of the pulse-modulated signal detector 12, may be of conventional construction and design, the details of which are well known in the art and do not require further description.

*General operation of transponder of Fig. 1*

Considering briefly the operation of the transponder of Fig. 1, as a whole, a desired pulse-modulated wave signal of the predetermined frequency is intercepted by the antenna system 11, is selected, amplified, converted to an intermediate-frequency signal, and further amplified in the unit 10, and the pulse-modulation components thereof are derived in the detector 12. These pulse-modulation components are amplified in the video-frequency amplifier 13 and are applied to the decoder 14 which develops an output signal for application to the reply-pulse generator 15 only in the event the pulses applied to the decoder have the proper code. When the decoder 14 applies an output signal to the reply-pulse generator 15, the latter develops output pulses in accordance with an established code for application to the transmitter 16 wherein they are amplified and are then employed to pulse-modulate the radio-frequency oscillator thereof. A pulse-modulated wave signal is radiated by the antenna system 17 of the transmitter 16 to suitable apparatus such as a terrestrially located interrogator-responser or a radar apparatus which may utilize the received information to determine the position and identity of the aircraft carrying the transponder under consideration.

*Description of pulse-detector system of Fig. 1*

Considering now the pulse-detector system 12 of Fig. 1, that system comprises a first detector 20 which is responsive to a pulse-modulated wave signal applied to a pair of input terminals 18, 18 thereof, which signal has a predetermined frequency but is subject to an undesired wave signal having that frequency. This undesirable wave signal ordinarily is the intermediate-frequency wave signal derived in unit 10 from a continuous-wave or jamming signal radiated by a remote transmitter for jamming purposes, which intermediate-frequency wave signal momentarily may have a frequency of the derived pulse-modulated intermediate-frequency wave signal such as when the former wave signal is swept over a range of frequencies including that of the latter wave signal. The first detector 20 is a conventional detector responsive to the wave signal applied to the terminals 18, 18 and includes a unidirectionally conductive device such as a diode 21 and a load impedance 22 therefor comprising a parallel-connected resistor 23 and a condenser 24 for deriving thereacross the pulse-modulation components of the applied wave signal in the absence of the undesired wave signal and also for deriving from the latter signal a control potential $e_2$ in a manner to be explained subsequently. One terminal of the impedance 22 is connected to ground and the other terminal is connected to the anode of the diode 21.

The pulse-detector system 12 also includes a second detector 25 coupled through a pair of condensers 31 and 32 in cascade with the first detector 20 and including a unidirectionally conductive device such as a diode 26 and a second load impedance 27 for deriving across the latter in the presence of the undesired wave signal the desired pulse-modulation components substantially free from that undesired signal. This second detector includes only passive elements, that is, circuit elements containing no sources of power such as batteries and the like. The cathode of the diode 26 is coupled to the anode of the diode 21 through the coupling condenser 31 and is also coupled to ground through a resistor 30 and a condenser 32 preferably having a capacitance considerably greater than that of the condenser 31, for example, fifty times as great. The load impedance 27 comprises a parallel-connected resistor-condenser network 28, 29 in which the condenser 29 comprises, in whole or in part, the distributed capacitance of the resistor 28 and the stray capacitance of the various electrical connections thereto. The resistor 30 has an impedance which is several times that of the resistor 28 and may, for example, be five times that of resistor 28. The time constant for the second load impedance 27 is ordinarily in the same order of magnitude as that of the first load impedance 22 and may, for example, be about five times as large. The load impedance 27 is coupled through a direct-current blocking condenser 33 to a pair of output terminals 19, 19 for the detector system 12.

The pulse-detector system 12 further includes a normally conductive unidirectionally conductive device such as a diode 36 effectively connected to by-pass the second detector 25, specifically to by-pass the series combination of the condenser 31 and the diode 26 in the absence of the aforesaid undesirable continuous-wave signal, and is further coupled to the first detector 20 to be rendered nonconductive by the control potential $e_2$ developed thereacross in the presence of the undesired wave signal. The diode 36 is coupled in back-to-back relation with the diode 26 through the coupling condenser 31.

The detector system 12 additionally includes a source of unidirectional bias potential which is connected to the diode 36 through the load impedances 22 and 27, specifically, through the resistors 23 and 28 thereof, and is effectively conductively isolated from the diode 26 by the condensers 31 and 32 for rendering the diode 36 conductive in the absence of the undesired continuous-wave signal at the terminals 18, 18 to by-pass the diode 26 in that absence and translate the pulse-modulation components derived by the first detector to the second load impedance 27. This source of bias potential may comprise a battery 37 and a voltage divider 38 connected between the terminals of the battery. The positive terminal of that battery is connected to ground and an adjustable tap 39 on the divider 38 is connected to the junction of the resistors 28 and 30 so that the potential $e_1$ developed between the tap and ground will be opposed by and canceled by the potential $e_2$ developed across the impedance 22 by the undesired wave signal insofar as their effects on the diode 36 are concerned.

*Explanation of operation of pulse-detector system of Fig. 1*

In considering the operation of the pulse-detector system 12 of Fig. 1, it will be assumed initially that the pulse-modulated wave signal applied to the terminals 18, 18 thereof from the carrier-frequency translator 10 does not include an undesired carrier-frequency wave signal of the type previously mentioned. Accordingly, the detector 20 including the diode 21 derives the modulation components across the load impedance 22 in the well-known manner. These components comprise negative-polarity rectangular pulses accompanied by random noise variations such as those represented by curve A of Fig. 2a. These pulses may be considered as appearing at point X of Fig. 1. Under the operating condition just assumed, the voltage $e_1$ developed across the indicated portion of the voltage divider 38 is applied through the resistors 23 and 28 to the diode 36 with such polarity that the latter becomes conductive. The negative pulse portions of curve A occurring during the intervals $t_1$–$t_2$ and $t_3$–$t_4$ render the diode 26 conductive during those intervals so that the pulses derived across the load impedance 22 are translated to the load impedance 27 through a relatively low-impedance path comprising the condenser 31, the diode 26, and the condenser 32. It will be recalled that the resistor 30 has a considerably greater impedance than the resistor 28. The pulses developed across the load impedance 27 are translated through the direct-current blocking condenser 33 to point Y and the output terminals 19, 19, and these pulses appear as substantially rectangular pulses such as those represented by curve B of Fig. 2a. During the leading edge portions of the pulses of curve A occurring at times $t_1$ and $t_3$, the condenser 29 is charged quickly by the signal translated through the diode 26 from point X of the network 22. During the trailing edge portions of the pulses of curve A occurring at times $t_2$ and $t_4$, the condenser 29, after being charged negatively during the leading edge portions of the pulses of curve B, is permitted to discharge through a low-impedance discharge path comprising the conductive diode 36. As a result, the trailing edges of curve B are steep, thus assuring a faithful translation of the pulses derived by the detector 20 to the output terminals 19, 19 of the pulse-detector system 12 in the absence of an undesired wave signal accompanying the desired wave signal applied to the input terminals 18, 18. Accordingly, the pulses of curve B are effectively replicas of the derived pulses of curve A.

It will now be assumed that the pulse-modulated wave signal applied to the input terminals 18, 18 is being jammed, that is, is subject to an undesired wave signal such as a continuous-wave signal which is recurrently being swept over a range of frequencies including that of the desired pulse-modulated wave signal. The undesired continuous-wave signal is detected by the detector 20 to derive across its load impedance 22 a unidirectional control potential of negative polarity having a value $e_2$ such as that represented in connection with curve C of Fig. 2b. This control potential, insofar as its effect on the diode 36 is concerned, opposes and overcomes the potential $e_1$ developed across the condenser 32 and renders the diode 36 nonconductive so long as a continuous-wave signal is applied to the terminals 18, 18. The signal appearing across the load impedance 22 may be represented by curve C and during the intervals $t_1$–$t_2$, and $t_3$–$t_4$, effectively comprises a pulse-type wave signal which constitutes a beat frequency between the pulse-modulated wave signal and the continuous-wave signal. Since the diode 36 is nonconductive at this time, the signal of curve C is applied to the detector system 25 through the condensers 31 and 32 and the diode 26 develops across the load impedance 27 negative-polarity pulses, which, after translation through the blocking condenser 33 to the output terminals 19, 19, appear as represented by curve D of Fig. 2b. The discharge time for the condenser 29 following the termination of the pulse-modulated wave signal C at times $t_2$ and $t_4$ is such that this condenser does not discharge as rapidly for the condition represented by curve B of Fig. 2a since under this condition the diode 36 is nonconducting. Accordingly, the trailing edges of the output pulses of curve D extend over the intervals $t_2$–$t_2'$ and $t_4$–$t_4'$. However, the slope of these trailing edges is sufficiently steep that the output pulses are of sufficiently rectangular wave form so that utilizing apparatus such as the decoder 14 coupled to the output terminals 19, 19 of unit 12 responds to those pulses. Thus, the detector 12 may be said to derive the pulse-modulation components of the applied pulse-modulated wave signal even though it is subject to an undesired wave signal having substantially the frequency of the pulse-modulated wave signal.

When the jamming operation mentioned above ceases, the control potential $e_2$ previously developed across the impedance 22 terminates and the diode 36 is rendered conductive by the potential $e_1$ so that the detector system 12 is again conditioned to develop at point Y the output pulses of curve B of Fig. 2a in the manner previously explained.

While applicant does not wish to be limited to any particular circuit values for the embodiment of the invention described above, the following is a set of values which may be utilized in the pulse-detector system of Fig. 1.

| | |
|---|---|
| Resistor 23 | 3.8 kilohms. |
| Resistor 28 | 22 kilohms. |
| Resistor 30 | 100 kilohms. |
| Resistor 38 | 20 kilohms (max.). |
| Condenser 24 | 5 micromicrofarads. |
| Condenser 29 | Approximately 5 micromicrofarads. |
| Condenser 31 | 200 micromicrofarads. |
| Condenser 32 | 10,000 micromicrofarads. |
| Battery 37 | 6 volts. |
| Voltage $e_1$ | Approximately 3–5 volts. |
| Voltage $e_2$ | Approximately 5 volts. |
| Diode 21 | ½ Type 1106 National Union. |
| Diode 26 | ½ Type 1106 National Union. |
| Diode 36 | ½ Type 1106 National Union. |
| Durations of applied wave-signal pulses | 1 microsecond. |
| Intermediate-frequency signal applied to terminals 18, 18 | Approximately 60 megacycles. |

From the foregoing description it will be seen that a pulse-detector system in accordance with the present invention is automatically conditioned to derive in its output circuit substantially rectangular pulses in response to an applied signal which includes desired wave-signal pulses but may also include an undesired continuous-wave signal having the frequency of the desired wave-signal pulses.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a second detector including only passive elements coupled in cascade with said first detector and including a load impedance for deriving thereacross in the presence of said undesired signal said pulse-modulation components substantially free from said undesired signal; a normally conductive unidirectionally conductive device, shunting said second detector and coupled to said first detector, to be rendered nonconductive by said control potential derived in the presence of said undesired signal; and means for maintaining said unidirectionally conductive device normally conductive in the absence of said undesired signal.

2. In a radio receiver for translating an applied pulse-modulated wave signal of a predetermined frequency but subject to an undesired wave signal having said frequency, a pulse-detector system comprising: a first detector responsive to said applied wave signal and including a first load impedance for deriving thereacross the pulse-modulation components thereof in the absence of said undesired signal and for deriving from the latter a control potential; a second detector including only passive elements coupled in cascade with said first detector and including a second load impedance for deriving thereacross in the presence of said undesired signal said pulse-modulation components substantially free from said undesired signal; a normally conductive unidirectionally conductive device, shunting said second detector and coupled to said first load impedance, to be rendered non-conductive by said control potential derived in the presence of said undesired signal; and means for maintaining said unidirectionally conductive device normally conductive in the absence of said undesired signal.

3. In a radio receiver for translating an applied pulse-modulated wave signal of a predetermined frequency but subject to an undesired wave signal having said frequency, a pulse-detector system comprising: a first detector responsive to said applied wave signal and including a first load impedance for deriving thereacross the pulse-modulation components thereof in the absence of said undesired signal and for deriving from the latter a control potential; a second detector including only passive elements coupled in cascade with said first detector and including a second load impedance for deriving thereacross in the presence of said undesired signal said pulse-modulation components substantially free from said undesired signal; a normally conductive unidirectionally conductive device, connected between said load impedances and shunting said second detector, to be rendered nonconductive by said control potential derived in the presence of said undesired signal; and means for maintaining said unidirectionally conductive device normally conductive in the absence of said undesired signal.

4. In a radio receiver for translating an applied pulse-modulated wave signal of a predetermined frequency but subject to an undesired wave signal having said frequency, a pulse-detector system comprising: a first detector responsive to said applied wave signal and including a first load impedance for deriving thereacross the pulse-modulation components thereof in the absence of said undesired signal and for deriving from the latter a control potential; a second detector including only passive elements coupled in cascade with said first detector and including a second load impedance having a time constant greater than that of said first load impedance for deriving thereacross in the presence of said undesired signal said pulse-modulation components substantially free from said undesired signal; a normally conductive unidirectionally conductive device, shunting said second detector and coupled to said first detector, to be rendered nonconductive by said control potential derived in the presence of said undesired signal; and means for maintaining said unidirectionally conductive device normally conductive in the absence of said undesired signal.

5. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a second detector including only passive elements coupled in cascade with said first detector and including a first unidirectionally conductive device and a load impedance for deriving across said impedance in the presence of said undesired signal said pulse-modulation components substantially free from said undesired signal; a normally conductive second unidirectionally conductive device, shunting said second detector, the cathode thereof being directly connected to the anode of said first unidirectionally conductive device and the anode of said second unidirectionally conductive device being coupled through a condenser to the cathode of said first unidirectionally conductive device, said second unidirectionally conductive device to be rendered nonconductive by said control potential derived in the presence of said undesired signal; and means for maintaining said second unidirectionally conductive device normally conductive in the absence of said undesired signal.

6. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a second detector including only passive elements coupled in cascade with said first detector and including a first unidirectionally conductive device and a load impedance having a condenser for deriving across said condenser in the presence of said undesired signal said pulse-modulation components substantially free from said undesired signal; a normally conductive unidirectionally conductive device, shunting said second detector and coupled to said first detector, to be rendered nonconductive by said control potential derived in the presence of said undesired signal; and means for maintaining said unidirectionally conductive device normally conductive in the absence of said undesired signal.

7. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a second detector including only passive elements coupled in cascade with said first detector and including a first unidirectionally conductive device and a load impedance for deriving across said impedance in the presence of said undesired signal said pulse-modulation components substantially free from said undesired signal; a second unidirectionally conductive device coupled to said first detector and rendered nonconductive by said control potential in the presence of said undesired signal; and a source of unidirectional bias potential connected to said second device and conductively isolated from said first device for rendering said second device conductive in the absence of said undesired signal to by-pass said first device for unidirectional potentials during the intervals between pulses of said pulse-modulation components in said absence.

8. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a second detector including only passive elements coupled in cascade with said first detector and including in series relation a condenser, a first unidirectionally conductive device, a load impedance, and a second condenser for deriving across said impedance in the presence of said undesired signal said pulse-modulation components substantially free from said undesired signal; a second unidirectionally conductive device coupled to said first detector and rendered nonconductive by said control potential in the presence of said undesired signal; and a source of unidirectional bias potential connected to said second device and conductively isolated from said first device by said condensers for rendering said second device conductive in the absence of said undesired signal to by-pass said first device for unidirectional potentials during the intervals between pulses of said pulse-modulation components in said absence.

9. In a radio receiver for translating an applied pulse-modulated wave signal of a predetermined frequency but subject to an undesired wave signal having said frequency, a pulse-detector system comprising: a first detector responsive to said applied wave signal and including a first load impedance for deriving thereacross the pulse-modulation components thereof in the absence of said undesired signal and for deriving thereacross from the latter signal a control potential; a second detector including only passive elements coupled in cascade with said first detector and including in series relation a condenser, a first unidirectionally conductive device, a second load impedance, and a second condenser for deriving across said second impedance in the presence of said undesired signal said pulse-modulation components substantially free from said undesired signal; a second unidirectionally conductive device coupled to said first detector and rendered nonconductive by said control potential in the presence of said undesired signal; and a source of unidirectional bias potential connected to said second device through said load impedances and conductively isolated from said first device by said condensers for rendering said second device conductive in the absence of said undesired signal to by-pass said first device for unidirectional potentials during the intervals between pulses of said pulse-modulation components in said absence.

10. In a radio receiver for translating an applied pulse-modulated wave signal of a predetermined frequency but subject to an undesired wave signal having said frequency, a pulse-detector system comprising: a first detector responsive to said applied wave signal and including a first load impedance for deriving thereacross the pulse-modulation components thereof in the absence of said undesired signal and for deriving thereacross with a predetermined polarity from the latter signal a control potential; a second detector including only passive elements coupled in cascade with said first detector and including a first unidirectionally conductive device and a second load impedance for deriving thereacross in the presence of said undesired signal said pulse-modulation components substantially free from said undesired signal; a second unidirectionally conductive device coupled to said first detector and rendered nonconductive by said control potential in the presence of said undesired signal; and a source of unidirectional bias potential connected to said second device through at least said first load impedance with a polarity opposite said predetermined polarity and conductively isolated from said first device for rendering said second device conductive in the absence of said undesired signal to by-pass said first device for unidirectional potentials during the intervals between pulses of said pulse-modulation components in said absence.

11. In a radio receiver for translating an applied pulse-modulated wave signal of a predetermined frequency but subject to an undesired wave signal having said frequency, a pulse-detector system comprising: a first detector responsive to said applied wave signal for deriving the pulse-modulation components thereof in the absence of said undesired signal and for deriving from the latter a control potential; a first condenser; a second condenser having a capacitance much greater than that of said first condenser; a second detector including only passive elements coupled in cascade with said first detector and including a unidirectionally conductive device and a load impedance in series relation with said condensers for deriving across said impedance in the presence of said undesired signal said pulse-modulation components substantially free from said undesired signal; a source of unidirectional bias potential connected in parallel with said second condenser; and a normally conductive unidirectionally conductive device connected to said source and connected to by-pass said first condenser and said device for unidirectional potentials during the intervals between pulses of said pulse-modulation components in the absence of said undesired signal and coupled to said first detector through said impedance and said source to be rendered nonconductive by said control potential in the presence of said undesired signal.

12. In a radio receiver for translating an applied pulse-modulated wave signal of a predetermined frequency but subject to an undesired wave signal having said frequency, a pulse detector system comprising: a first detector responsive to said applied wave signal and including a first load impedance for deriving thereacross the pulse-modulation components thereof in the absence of said undesired signal and for deriving from the latter a control potential; a first condenser; a second condenser having a capacitance much greater than that of said first condenser; a second detector including only passive elements coupled in cascade with said first detector and including a unidirectionally conductive device and a second load impedance in series relation with said condensers for deriving across said second impedance in the presence of said undesired signal said pulse-modulation components substantially free from said undesired signal; a source of unidirectional bias potential connected in parallel with said second condenser; and a normally conductive unidirectionally conductive device connected to said source through said impedances and to by-pass said first condenser and said device for unidirectional potentials during the intervals between pulses of said pulse-modulation components in the absence of said undesired signal and coupled to said first impedance through said second impedance and said source to be rendered nonconductive by said control potential in the presence of said undesired signal.

References Cited in the file of this patent

UNITED STATES PATENTS

| | | |
|---|---|---|
| 2,103,878 | Thompson | Dec. 28, 1937 |
| 2,410,735 | Hoisington | Nov. 5, 1946 |
| 2,410,736 | Hoisington | Nov. 5, 1946 |
| 2,453,958 | Andresen | Nov. 16, 1948 |
| 2,612,630 | Greenleaf | Sept. 30, 1952 |